(12) United States Patent
De Oliva

(10) Patent No.: US 10,866,867 B2
(45) Date of Patent: Dec. 15, 2020

(54) METHOD OF ERROR CORRECTION IN A FLASH MEMORY

(71) Applicants: Continental Automotive France, Toulouse (FR); Continental Automotive GmbH, Hannover (DE)

(72) Inventor: José De Oliva, Orsay (FR)

(73) Assignees: Continental Automotive France; Continental Automotive GmBH

(*) Notice: Subject to any disclaimer, the term of this patent is extended or adjusted under 35 U.S.C. 154(b) by 119 days.

(21) Appl. No.: 16/323,868

(22) PCT Filed: Sep. 7, 2017

(86) PCT No.: PCT/FR2017/052378
§ 371 (c)(1),
(2) Date: Feb. 7, 2019

(87) PCT Pub. No.: WO2018/046857
PCT Pub. Date: Mar. 15, 2018

(65) Prior Publication Data
US 2019/0171534 A1    Jun. 6, 2019

(30) Foreign Application Priority Data
Sep. 8, 2016 (FR) ...................... 16 58324

(51) Int. Cl.
*G06F 11/14* (2006.01)
*G06F 11/16* (2006.01)
(Continued)

(52) U.S. Cl.
CPC ........ *G06F 11/1469* (2013.01); *G06F 9/4403* (2013.01); *G06F 11/1417* (2013.01);
(Continued)

(58) Field of Classification Search
CPC .... G06F 11/1417; G06F 9/4401; G06F 9/441; G06F 11/1666; G06F 11/1469
See application file for complete search history.

(56) References Cited

U.S. PATENT DOCUMENTS

2005/0160217 A1   7/2005   Gonzalez et al.
2006/0155979 A1   7/2006   Blinick et al.
(Continued)

OTHER PUBLICATIONS

International Search Report and Written Opinion for International Application No. PCT/FR2017/052378, dated Oct. 27, 2017—9 pages.

*Primary Examiner* — Kamini B Patel
*Assistant Examiner* — Kurosu Risa Altaf
(74) *Attorney, Agent, or Firm* — RatnerPrestia

(57) ABSTRACT

A method of error correction in a nonvolatile flash memory of NAND type, the memory including a first and a second, identical, copies of software to be loaded, a page of a block occupied by data of the first copy of the software being corrupted, and a page of a block occupied by data of the second copy of the software being corrupted, the method including: the replacement of the block occupied by the second copy of the software and including a corrupted page with the identical block occupied by the first copy of the software, making it possible to correct the second copy of the software; the re-execution of the boot loading program; the loading of the second copy of the software.

7 Claims, 2 Drawing Sheets

(51) Int. Cl.
*G06F 9/4401* (2018.01)
*G06F 11/20* (2006.01)
(52) U.S. Cl.
CPC .......... *G06F 11/1666* (2013.01); *G06F 11/20* (2013.01); *G06F 2201/82* (2013.01); *G06F 2201/84* (2013.01)

(56) References Cited

U.S. PATENT DOCUMENTS

| | | |
|---|---|---|
| 2011/0283136 A1 | 11/2011 | Edwards et al. |
| 2014/0019741 A1* | 1/2014 | Nautiyal ............... G06F 9/4408 713/2 |
| 2015/0248249 A1* | 9/2015 | Amidi ................ G06F 11/1612 711/103 |
| 2015/0301880 A1* | 10/2015 | Allu .................... G06F 11/0793 714/4.3 |

* cited by examiner

METHOD OF ERROR CORRECTION IN A FLASH MEMORY

CROSS REFERENCE TO RELATED APPLICATIONS

This application is the U.S. National Phase Application of PCT International Application No. PCT/FR2017/052378, filed Sep. 7, 2017, which claims priority to French Patent Application No. 1658324, filed Sep. 8, 2016, the contents of such applications being incorporated by reference herein.

FIELD OF THE INVENTION

The invention relates to the field of nonvolatile memories of "NAND flash" type within the broader field of embedded systems, especially automotive systems.

BACKGROUND OF THE INVENTION

Flash memories of NAND type allow the persistent storage of data. These data are in principle associated with an automatic correction algorithm, or error-correcting code, referred to by the English abbreviation ECC, for "Error Correction Code", so as to safeguard said embedded systems against corruption of the data stored in their nonvolatile memory.

However, uncorrectable errors may occur, and the embedded systems then generate an exception when reading an uncorrectable error such as this.

SUMMARY OF THE INVENTION

In this context, an aspect of the present invention relates to a method making it possible to correct, in a nonvolatile memory of "NAND flash" type, certain errors which are not correctable by known automatic correction algorithms.

As is known, automotive vehicles, like any other type of vehicle, comprise computers able to execute embedded software.

To this end, said embedded systems exhibit means for storing data, stated otherwise memories, volatile or nonvolatile. Embedded systems such as these thus exhibit in particular a volatile memory, also called random-access memory, typically memory of RAM type, for "Random Access Memory" according to the English acronym well known to the person skilled in the art.

Microcontrollers, old or current, make use internally of flash memory of NOR type making it possible to guarantee 100% integrity of the stored data.

Today, embedded systems are increasingly embedding flash memory of NAND type, well known to the person skilled in the art, which exhibits the advantage of modest cost and large storage capacities, and the drawback of an inability to guarantee 100% integrity of the stored data. Flash memory of NAND type is in particular used to back up the microcontroller's software, also called "firmware" according to the English term well known to the person skilled in the art, and to back up data relating to the life cycles of the embedded system and of its software.

In practice, when the software embedded in the system is executed, the latter reads the flash memory to allow the loading and the implementation of application software and the proper execution of the decisional functions that it comprises.

More precisely, the computer concerned in the loading and the execution of software hosted on a flash memory of NAND type calls upon a boot program to start said flash memory, said boot program being able to be referred to by the person skilled in the art by the abbreviation RBL for "ROM Boot Loader" in English. This boot program executes a boot loading program, known to the person skilled in the art by the abbreviation UBL for "User Boot Loader", whose function is to load the software to be executed, stored on the flash memory, into random-access memory.

Moreover, in the context of embedded computers, in particular in the automotive field, it is well known that flash memory of NAND type is a nonvolatile memory which is much used, because of its economic competitivity and its compactness.

A known problem related to the use of flash memory of NAND type resides, however, in the difficulty in ensuring the consistency of the data stored therein. Indeed, a well-known defect of flash memories resides in the risk of physical alteration of the bits of which it is composed. A physical alteration of a bit typically induces a risk of undesired change of the value of said bit, on account of a variation of the value of the voltage across its terminals.

According to the prior art, as mentioned briefly hereinabove, there exist embedded systems with flash memory of NAND type in which the backed-up data are associated with an automatic correction algorithm of ECC type, for "Error Correction Code".

By virtue of the associating of the data backed up in the flash memory with an error correction code, the prior art makes it possible to detect and to process a large part of the errors relating to an inconsistency of the data read in flash memory.

However, among the errors which may occur when reading data in flash memory of NAND type, some are not correctable by an automatic correction algorithm of ECC type. In this case, when in the course of execution an embedded system attempts to read a datum corresponding to an uncorrectable error, the system raises an exception which generally entails the rebooting of the embedded system, or indeed that of the computer.

A technical problem then resides in the fact that in case of uncorrectable physical alteration of the memory, the computer may enter a loop of failures when booting followed by reboots. Anyway, the embedded system does not succeed in loading the desired software.

To alleviate this problem, in the prior art, a first simple solution consists in loading a program inviting the user to update the software. During reinstallation of said software, possibly modified, the problem is very probably corrected.

In order to avoid this manipulation and the temporary unavailability of the software, a second solution is known, consisting in storing, in flash memory, an alternate copy of the software to be loaded, also called a backup copy of the software, corresponding to a duplication, that is to say to an identical copy of the software to be loaded. Indeed, generally, when the software to be executed is of modest size, it can be stored as two identical copies (or two "instances") on the flash memory, so that it is assumed to be statistically very improbable that the two copies are corrupted simultaneously, one copy then ensuring the backup copy function of the other version. The boot loading program chooses the copy of the software to be loaded into random-access memory.

Thus, in case the loading of a first copy of the software fails, the flash memory boot loading program seeks to load the alternate copy.

The alternate copy of the software can then, as is known, serve as source for "repairing" the corrupted version of the software stored in flash memory.

A limit of this known technique arises, however, when the backup version, that is to say the identical copy of the corrupted version of the software, turns out to be corrupted itself. While statistically fairly modest, the probability exists that both versions of the software to be loaded are corrupted and the prior art does not comprise any simple solution to this problem. However, though a high number of instances of the boot loading program can be stored in random-access memory, so that the boot program does in all likelihood have the possibility of executing an instance thereof which is not corrupted, the same does not hold for the items of software embedded on the initiative of the user. Indeed, the size and the number of these user items of software are in practice too large to allow more than two copies of said items of software to be stored in flash memory.

A need therefore exists for a method able to manage the occurrence of errors that are uncorrectable by the known algorithms of ECC type, at one and the same time in the first copy of the software to be loaded read by the boot loading program and in the backup copy read by a boot loading program after (re-)booting of the computer.

To this end, more precisely, the subject of an aspect of the present invention is a method of error correction in a nonvolatile flash memory of NAND type, said flash memory comprising a set of blocks which the application accesses in read mode or in write mode or in erase mode, each block comprising a plurality of pages, said memory comprising a first and a second, identical, copies of software to be loaded, the first and the second copies of the software physically occupying an equal number of distinct blocks, a page of a block occupied by data of the first copy of the software being corrupted, and a page of a block occupied by data of the second copy of the software being corrupted, said method comprising the execution of a boot loading program implementing the following steps:

the attempted loading of the first copy of the software by the boot loading program;
the discovery by the boot loading program that at least one page of a block occupied by the first copy of the software is corrupted;
the recording of an identification of said at least one corrupted page in a persistent memory of the flash memory;
the configuration of the boot loading program so that it loads the second copy of the software at the next execution;
the re-execution of the boot loading program;
the attempted loading of the second copy of the software by the boot loading program;
the discovery by the boot loading program that at least one page of a block occupied by the second copy of the software is corrupted;
the recording of an identification of said at least one corrupted page in a persistent memory of the flash memory;
the replacement of the block occupied by the second copy of the software comprising a corrupted page with the identical block occupied by the first copy of the software not comprising any corrupted page, making it possible to correct the second copy of the software;
the re-execution of the boot loading program;
the loading of the second copy of the software.

By virtue of the method according to an aspect of the invention, when two sets of blocks of a flash memory which are occupied respectively by two copies of software to be loaded each comprise at least one block comprising a page corrupted by an error which is uncorrectable by an automatic error correction algorithm of ECC type, it is possible to correct each of the two copies and to load the software into random-access memory.

Advantageously, the method according to an aspect of the invention moreover comprises the replacement of the corrupted block of the first copy of the software by the identical block occupied by the second copy of the software, making it possible to correct the first copy of the software to be loaded.

According to one embodiment, the method according to an aspect of the invention comprises, before the replacement of the corrupted block of the second copy of the software, when two distinct pages of two identical blocks are corrupted, that is to say when, in blocks intended to be occupied by identical data, respectively of the first and of the second copies of the software to be loaded, two pages intended to contain distinct data, respectively in each of said blocks, are corrupted:

the implementation of an algorithm configured to reconstruct an uncorrupted block corresponding to said corrupted blocks, on the basis of the data occupying uncorrupted pages of each of said corrupted blocks,
the replacement of the corrupted block of the first copy of the software to be loaded with said reconstructed uncorrupted block.

Thus, according to this embodiment, when two identical blocks hosting data relating to the two copies of the software to be loaded are corrupted, in different pages, an uncorrupted equivalent block is reconstructed on the basis of the uncorrupted pages of each of said blocks. This reconstructed uncorrupted block is available to repair the two corrupted blocks.

An aspect of the present invention also envisages an embedded system comprising a boot loading program configured to implement the method briefly described hereinabove.

An aspect of the present invention also envisages a computer comprising a boot loading program configured to implement the method briefly described hereinabove.

An aspect of the present invention also envisages an automotive vehicle comprising such a computer.

BRIEF DESCRIPTION OF THE DRAWINGS

Aspects of the invention will be better understood on reading the description which follows, given solely by way of example, and referring to the appended drawings which represent.

It should be noted that the figures set forth aspects of the invention in a detailed manner so as to enable the implementation thereof, said figures also being able to serve to better define aspects of the invention, of course.

DETAILED DESCRIPTION OF THE PREFERRED EMBODIMENTS

An aspect of the invention is presented mainly with a view to an implementation of the method of error correction in a flash memory of NAND type comprising two identical versions of software to be loaded, whatever the technical field in which said flash memory is implemented.

However, the method according to an aspect of the invention envisages in particular the automotive technical field, in which nonvolatile memories, of "NAND flash" memory type, are regularly implemented, and in which the life cycle of the product (the automobile) may be long in regard to the number of cycles permitted on said flash memories.

Figure 1:
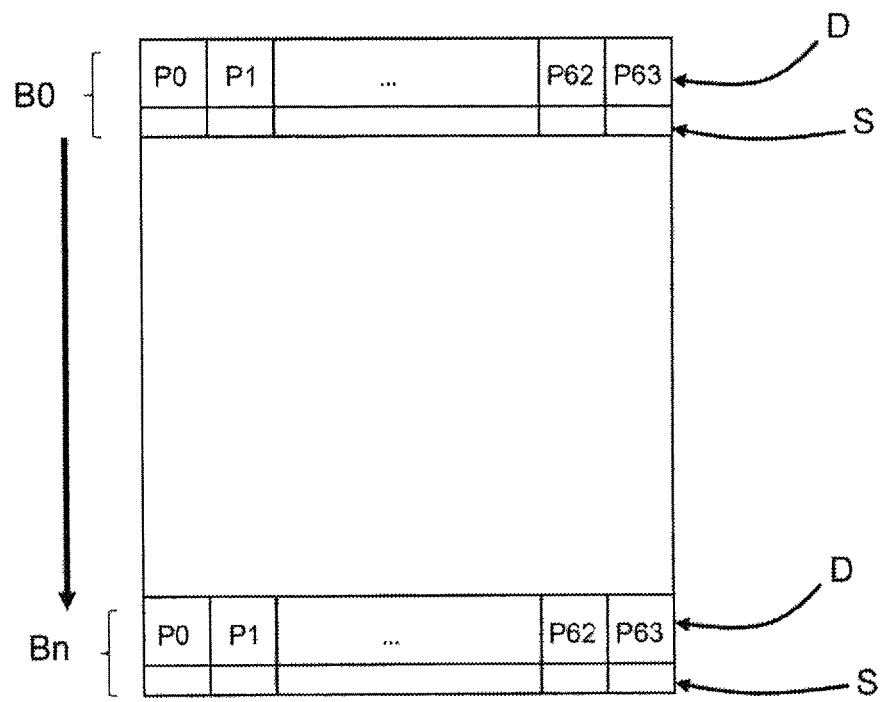
FIG. 1, the basic diagram of a memory of "NAND flash" type, according to the prior art.

With reference to FIG. 1, as is known to the person skilled in the art, a memory of "NAND flash" type is divided into blocks B0, B1, . . . , Bn each comprising several pages P0, P1, . . . , P62, P63. Moreover, each page consists of a "data" area D, and a "spare" area S. The spare area S comprises in particular a special tag comprising an item of information relating to the possibly corrupted character of the corresponding page.

In practice, an application accesses a page in read/write mode and carries out erasures block by block.

Figure 2:
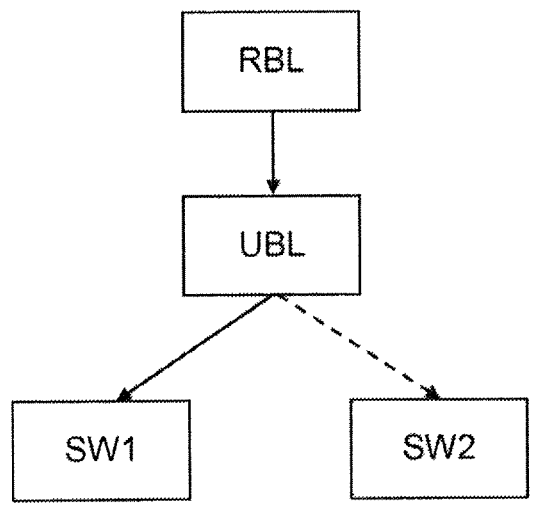
FIG. 2, the chart representing the principle of execution of a boot loading program.

As mentioned previously, and with reference to FIG. 2, a boot program RBL, also referred to in English by the expression "ROM Boot Loader", is executed on booting the embedded system. The boot program RBL loads into random-access memory a boot loading program UBL so as to allow the execution thereof. Although this is not represented, as indicated previously several instances of the boot loading program UBL may exist in flash memory, one of these instances, valid, being loaded into random-access memory, with a view to its execution, by the boot program RBL. The boot loading program UBL, also referred to in English by the expression "User Boot Loader", ensures the function of loading desired executable software, stored in a flash memory of NAND type, into random-access memory. The software to be loaded exists in at least two identical copies SW1, SW2 in flash memory.

The boot loading program UBL is for example configured, on launching the software loading process, to load a first copy SW1 of the software into random-access memory. The boot loading program UBL consequently accesses the data present in the flash memory and corresponding to the first copy SW1 of the software. For each page of each block hosting said data, the boot loading program UBL verifies the integrity of the data present in said page, by reading the tag provided for this purpose.

In case of corruption of a page, because of an error in at least one bit which is uncorrectable by an automatic correction algorithm of ECC type, the loading of the first copy SW1 of the software is interrupted and the configuration of the boot loading program UBL is modified in such a way that it boots, the next time, on the second, alternate, copy SW2 of the software.

The boot loading program UBL then reboots and seeks to load the second copy SW2 of the software.

According to the prior art, this strategy makes it possible to solve most cases of alteration of bits of a flash memory. However, a major problem persists in the case where a bit of a page hosting data corresponding to the second copy SW2 of the software is corrupted, without being correctable by an automatic correction algorithm of ECC type. In the prior art, the problem is then insoluble in a simple manner.

Figure 3:
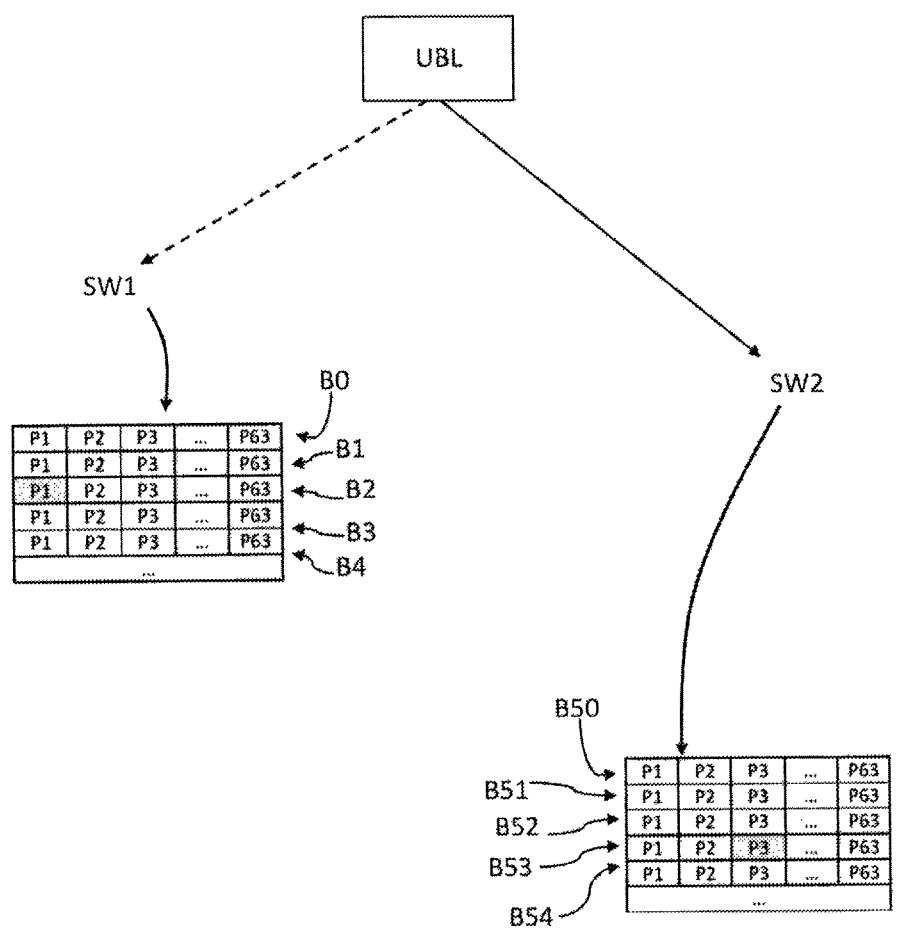
FIG. 3, the chart representing the principle of the method according to an aspect of the invention.

With reference to FIG. 3, the method according to an aspect of the invention makes it possible to avert this eventuality.

Indeed, under the assumption that the two identical copies SW1, SW2 of the software to be loaded into random-access memory are corrupted, forming the subject of an error which is uncorrectable by an automatic correction algorithm of ECC type, the method according to an aspect of the invention makes it possible to avoid entering an infinite loop of failures on booting followed by rebootings of the boot loading program UBL.

To this end, by way of nonlimiting example, reference is made to FIG. 3 in which a first copy SW1 of the software to be loaded is stored in flash memory on N blocks, i.e. blocks B0 to B4 of said flash memory, while a second copy SW2 is stored between them in flash memory on N blocks, i.e. blocks B50 to B54 of said flash memory, blocks B0 and B50 being intended to contain identical data of the software, as are, respectively, blocks B1 and B51, blocks B2 and B52, blocks B3 and B53, blocks B4 and B54, etc. Each block comprises 64 pages numbered from P1 to P63. It is recalled again that the total numbers of pages or blocks and the page numbers or block numbers of the flash memory are chosen here purely by way of illustration. Thus, for example, page P1 of block B2, affecting the first copy SW1, is corrupted by an error which is uncorrectable by an automatic correction algorithm of ECC type, and page P3 of block B53, affecting the second copy SW2, is also corrupted by an error which is uncorrectable by an automatic correction algorithm of ECC type.

The boot loading program UBL then ensures the repair of the two corrupted copies by "flashing", that is to say by erasing and then rewriting the blocks comprising the corrupted page, by copying the corresponding uncorrupted block arising from the other copy of the software.

In the chosen example, the boot loading program is assumed to have attempted to boot the first copy SW1 of the software. Because of the corruption of page P1 of block B2, this item of information being stored in persistent memory of the flash memory, the boot loading program UBL has its configuration modified in such a way that it attempts to load the second copy SW2 of the software at the next boot, and it reboots.

The attempted loading of the second copy SW2 of the software also fails because of the corruption of page P3 of block B53, this item of information being stored in persistent memory of the flash memory. Hence, the boot loading program UBL knows that both copies SW1, SW2 of the software to be loaded are corrupted.

Therefore, the boot loading program UBL "flashes" block B53 by erasing it and then copying the content of block B3 thereto, which is identical and uncorrupted.

Thereupon, the boot loading program UBL, according to one embodiment, also repairs the first copy of the software by "flashing" block B2 with the aid of the content of block B52, which is identical and uncorrupted.

The previous example is suited to a situation in which the block, comprising a corrupted page, occupied by the first copy SW1 of the software and the block, comprising a corrupted page, occupied by the second copy SW2 of the software are distinct, that is to say that said blocks respectively comprising a corrupted page are not configured to be occupied by identical data of the software.

However, in the same way, if two different pages of one and the same block, that is to say, for example page P1 of block B1 and page P12 of block B51, are corrupted by an error which is uncorrectable by an automatic correction algorithm of ECC type, each block is repaired by means of a healthy block which is reconstructed, in an intermediate step, on the basis of healthy pages of both the blocks.

It should be noted that the act of "flashing" the corrupted block in order to repair it exhibits the incidental advantage of reloading the corresponding bits of the flash memory, reducing the risk of experiencing the presence of erroneous bits because of undesired toggling of their value following the "fatigue" of the flash memory entailing a dip in the voltage across these bits (phenomenon of "bit flipping" according to the usual expression in English).

To summarize, the method according to an aspect of the invention makes it possible to boot a software application duplicated on a flash memory of NAND type, even when both copies are corrupted.

It is specified, furthermore, that aspects of the present invention are not limited to the embodiment described hereinabove and is susceptible of variants accessible to the person skilled in the art.

The invention claimed is:

1. A method of error correction in a nonvolatile flash memory of NAND type, said flash memory comprising a set of blocks which are accessed in a read mode or in a write mode or in an erase mode, each block comprising a plurality of pages, said memory comprising a first and a second, identical, copies of software to be loaded, the first and the second copies of the software physically occupying an equal number of distinct blocks, a page of a block occupied by data of the first copy of the software being corrupted, and a page of a block occupied by data of the second copy of the software being corrupted, said method comprising the execution of a boot loading program implementing the following steps:
   an attempted loading of the first copy of the software by the boot loading program;
   discovering by the boot loading program that at least one page of a block occupied by the first copy of the software is corrupted;
   recording of an identification of said at least one corrupted page in a persistent memory of the flash memory;
   configuring the boot loading program so that it loads the second copy of the software at the next execution;
   re-executing of the boot loading program;
   an attempted loading of the second copy of the software by the boot loading program;
   discovering by the boot loading program that at least one page of a block occupied by the second copy of the software is corrupted;
   recording of an identification of said at least one corrupted page of the second copy of the software in a persistent memory of the flash memory;
   the replacement of the block occupied by the second copy of the software comprising a corrupted page with the identical block occupied by the first copy of the software not comprising any corrupted page, making it possible to correct the second copy of the software;
   re-executing of the boot loading program; and
   loading of the second copy of the software.

2. The method as claimed in claim 1, moreover comprising the replacement of the corrupted block of the first copy of the software with the identical block occupied by the second copy of the software, making it possible to correct the first copy of the software to be loaded.

3. The method as claimed in claim 1, comprising, before the replacement of the corrupted block of the second copy of the software, when two distinct pages of two identical blocks are corrupted, that is to say when, in blocks intended to be occupied by identical data, respectively of the first and of the second copies of the software to be loaded, two pages intended to contain distinct data, respectively in each of said blocks, are corrupted:
   implementing an algorithm configured to reconstruct an uncorrupted block corresponding to said corrupted blocks, on the basis of the data occupying uncorrupted pages of each of said corrupted blocks, and
   replacing the corrupted block of the first copy of the software to be loaded with said reconstructed uncorrupted block.

4. An embedded system comprising a boot loading program configured to implement the method as claimed in claim 1.

5. A computer comprising a boot loading program configured to implement the method as claimed in claim 1.

6. An automotive vehicle comprising a computer as claimed in claim 5.

7. The method as claimed in claim 2, comprising, before the replacement of the corrupted block of the second copy of the software, when two distinct pages of two identical blocks are corrupted, that is to say when, in blocks intended to be occupied by identical data, respectively of the first and of the second copies of the software to be loaded, two pages intended to contain distinct data, respectively in each of said blocks, are corrupted:
   implementing an algorithm configured to reconstruct an uncorrupted block corresponding to said corrupted blocks, on the basis of the data occupying uncorrupted pages of each of said corrupted blocks, and
   replacing the corrupted block of the first copy of the software to be loaded with said reconstructed uncorrupted block.

* * * * *